United States Patent
Okada

(10) Patent No.: US 11,927,723 B2
(45) Date of Patent: Mar. 12, 2024

(54) OPTICAL SYSTEM, IMAGE PICKUP APPARATUS, IN-VEHICLE SYSTEM, AND MOVING APPARATUS

(71) Applicant: CANON KABUSHIKI KAISHA, Tokyo (JP)

(72) Inventor: Takashi Okada, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 344 days.

(21) Appl. No.: 17/204,143

(22) Filed: Mar. 17, 2021

(65) Prior Publication Data

US 2021/0302695 A1    Sep. 30, 2021

(30) Foreign Application Priority Data

Mar. 25, 2020 (JP) ................. 2020-054087

(51) Int. Cl.
*G02B 13/18* (2006.01)
*B60R 11/04* (2006.01)
(Continued)

(52) U.S. Cl.
CPC ............ *G02B 13/002* (2013.01); *B60R 11/04* (2013.01); *G02B 15/15* (2013.01)

(58) Field of Classification Search
CPC .... G02B 13/18; G02B 13/002; G02B 13/003; G02B 13/0035; G02B 13/004; G02B 13/0045
See application file for complete search history.

(56) References Cited

U.S. PATENT DOCUMENTS 4,695,134 A * 9/1987 Nakayama ............... G02B 9/34
359/773
6,002,529 A * 12/1999 Kohno ........... G02B 15/144105
359/686
(Continued)

FOREIGN PATENT DOCUMENTS

CN    103529541 A    1/2014
CN    203882004 U    10/2014
(Continued)

OTHER PUBLICATIONS

Notification of the First Office Action issued by the China National Intellectual Property Administration on Nov. 22, 2022 in corresponding CN Patent Application No. 202110310143.2, with English Translation.
(Continued)

*Primary Examiner* — Christopher Stanford
(74) *Attorney, Agent, or Firm* — Carter, DeLuca & Farrell LLP

(57) ABSTRACT

An optical system consists of a front lens unit having a positive or negative refractive power, a diaphragm, and a rear lens unit having a positive refractive power, which are arranged in this order from an object side to an image side. The front lens unit includes an aspherical lens that has a positive refractive power on an optical axis, and is disposed closest to an object. The aspherical lens has an aspherical surface on the object side in which an off-axis radius of curvature is larger than an on-axis radius of curvature. A predetermined condition is satisfied.

20 Claims, 10 Drawing Sheets

(51) Int. Cl.
*G02B 13/00* (2006.01)
*G02B 15/15* (2006.01)

(56) References Cited

U.S. PATENT DOCUMENTS

| | | | | |
|---|---|---|---|---|
| 6,417,975 | B1 * | 7/2002 | Isono | G02B 13/04 |
| | | | | 359/753 |
| 7,639,430 | B2 * | 12/2009 | Shirasuna | G02B 15/177 |
| | | | | 359/686 |
| 8,164,839 | B2 * | 4/2012 | Nasu | G02B 23/2438 |
| | | | | 359/740 |
| 9,151,938 | B2 * | 10/2015 | Okada | G02B 15/144113 |
| 9,291,801 | B2 * | 3/2016 | Kubota | G02B 13/18 |
| 10,969,564 | B2 * | 4/2021 | Okada | G02B 13/02 |
| 10,976,522 | B2 * | 4/2021 | Takakubo | G02B 13/18 |
| 2021/0132321 | A1 * | 5/2021 | Shobayashi | G02B 13/08 |

FOREIGN PATENT DOCUMENTS

| | | |
|---|---|---|
| CN | 106990510 A | 7/2017 |
| CN | 207249227 U | 4/2018 |
| CN | 207611191 U | 7/2018 |
| CN | 109557637 A | 4/2019 |
| JP | 2009169082 A | 7/2009 |
| JP | 2014-164287 A | 9/2014 |
| JP | 2018-087938 A | 6/2018 |
| JP | 2020021047 A | 2/2020 |
| KR | 100553824 B1 * | 2/2006 |

OTHER PUBLICATIONS

Notice of Reasons for Refusal issued by the Japanese Patent Office dated Dec. 12, 2023 in corresponding JP Patent Application No. 2020-0154087, with English translation.

* cited by examiner

OPTICAL SYSTEM, IMAGE PICKUP APPARATUS, IN-VEHICLE SYSTEM, AND MOVING APPARATUS

BACKGROUND OF THE INVENTION

Field of the Invention

The present invention relates to an optical system suitable for an image pickup apparatus, such as an in-vehicle camera.

Description of the Related Art

It is important to have a wide angle of view for an optical system used in an image pickup apparatus such as an in-vehicle camera. In particular, in order to identify a vehicle license plate or the like, the imaging magnification may be large in the central area of the angle of view. Japanese Patent Laid-Open No. ("JP") 2014-164287 discloses an optical system including a first lens that is disposed closed to an object and has an aspherical surface in which a negative refractive power becomes stronger from an optical axis to the periphery of the first lens. JP 2018-087938 discloses an optical system having an aspherical surface in which a curvature of a meridional section changes from a positive value to a negative value.

The optical system disclosed in JP 2014-164287 supports imaging at a wide angle of view, but does not have a sufficient imaging magnification in the central area because of a short paraxial focal length. The optical system disclosed in JP 2018-087938 has a long paraxial focal length and a large imaging magnification in the central area, but has an imageable angle of view that is as wide as about 50° diagonally, which is not a sufficiently wide.

SUMMARY OF THE INVENTION

The present invention provides an optical system, an image pickup apparatus, an in-vehicle system, and a moving apparatus, each of which has a large imaging magnification in a central area and a wide angle of view.

An optical system according to one aspect of the present invention consists of a front lens unit having a positive or negative refractive power, a diaphragm, and a rear lens unit having a positive refractive power, which are arranged in this order from an object side to an image side. The front lens unit includes an aspherical lens that has a positive refractive power on an optical axis, and is disposed closest to an object. The aspherical lens has an aspherical surface on the object side in which an off-axis radius of curvature is larger than an on-axis radius of curvature. The following conditional expressions are satisfied:

$$0.45 \leq D1s/L \leq 0.65$$

$$2.6 \leq Dr8/Dr4 \leq 30.0$$

where D1s is a distance on the optical axis from the aspherical surface to the diaphragm, L is an overall optical length of the optical system, and Dr4 and Dr8 are sag amounts from a reference spherical surface at positions of 40% and 80% of an effective diameter of the aspherical surface, respectively.

An image pickup apparatus, an in-vehicle system, and a moving apparatus each having the above optical system also constitute another aspect of the present invention.

Further features of the present invention will become apparent from the following description of exemplary embodiments with reference to the attached drawings.

DESCRIPTION OF THE EMBODIMENTS

Figure 14A:
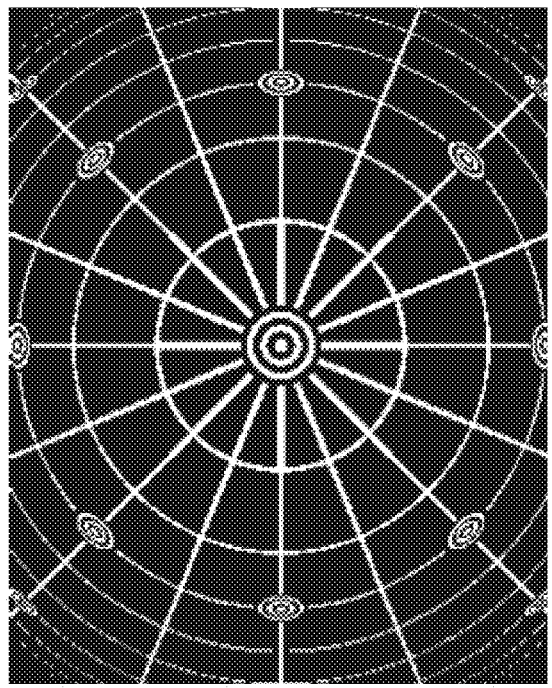
FIGS. 14A and 14B illustrate an image captured by a conventional wide-angle lens and an image captured by the optical system according to each example.

Referring now to the accompanying drawings, a description will be given of embodiments according to the present invention. When the conventional wide-angle lens (imaging optical system) of a general iso-solid angle projection method is used, an captured image having an evenly divided angle of view can be obtained as shown in FIG. 14A. In this captured image, the imaging magnification in the central area is small, the object in the central area is captured in a small size, and the resolution is difficult.

Figure 14B:
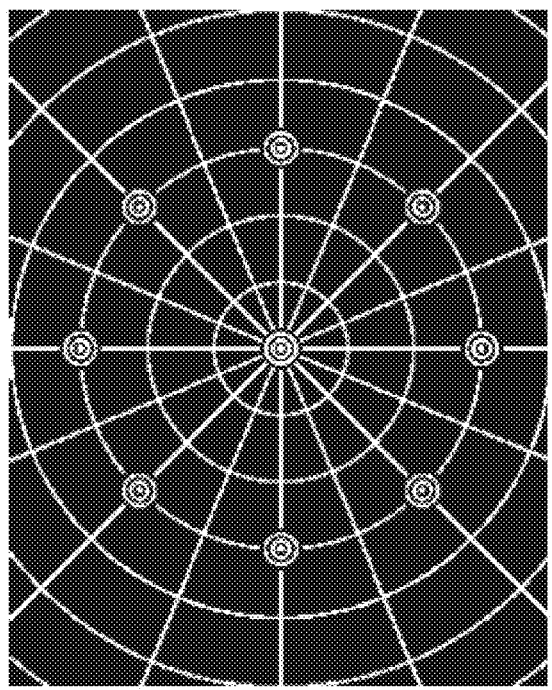

On the other hand, the optical system (imaging optical system) according to each example of the present invention has a large imaging magnification of the object in the central area by adopting a standard lens. More specifically, each example sets the optical system such that a focal length in terms of 35 mm film is about 40 mm to 50 mm. A normal standard lens cannot capture a wide angle of view. Thus, the optical system according to this example squeezes the object image in the peripheral area into the angle of view by increasing the barrel-shaped distortion. The optical system according to this example can provide, as shown in FIG. 14B, an image captured with a wide angle of view in the horizontal direction while capturing the object in the central area larger than that with the wide-angle lens described above.

FIGS. 1, 3, 5, 7, 9 and 11 are sectional views of the optical systems according to Examples 1, 2, 3, 4, 5 and 6, respectively. The optical system according to each example is one suitable for an image pickup apparatus such as a digital still camera or a video camera, more particularly an in-vehicle camera or a surveillance camera. In each sectional view, the left side is the object side (front side), and the right side is the image side (rear side). OA denotes an optical axis of the optical system. Bi denotes a lens unit in order counted from the object side, B1 denotes a front lens unit, and B2 denotes a rear lens unit. GB denotes an optical block corresponding to an optical filter, a face plate, a crystal low-pass filter, an infrared cut filter, and the like. IP denotes an image plane, on which an imaging plane of a solid-state image sensor such as a CCD sensor or a CMOS sensor is disposed.

In the optical system according to each example, a diaphragm (aperture stop) SP is disposed between the front lens unit B1 and the rear lens unit B2. In other words, in the optical system according to each example, the lens unit on the object side of the diaphragm SP is the front lens unit B1, and the lens unit on the image side of the diaphragm SP is the rear lens unit B2. By sandwiching the diaphragm SP between the front lens unit B1 and the rear lens unit B2 in this way, the distortion is controlled at a position where the paraxial ray is high in the front lens unit B1 and the rear lens unit B2. Since keeping the diaphragm SP away from the image sensor can reduce the incident angle of the imaging light on the image sensor, the deterioration of the captured image caused by shading or the like can be suppressed.

The optical system according to each example consists of the front lens unit B1, the diaphragm SP, and the rear lens unit B2, which are arranged in this order from the object side to the image side. The front lens unit B1 has a positive or negative refractive power, and the rear lens unit B2 has a positive refractive power. In order to produce a large barrel-shaped distortion in a standard lens, it is necessary to control the distortion using an aspherical lens. Since the distortion tends to be large at a high position of the pupil paraxial ray, the diaphragm SP is sandwiched between the front lens unit B1 and the rear lens unit B2. At this time, since the height of the pupil paraxial ray is high in the lens closest to the object in the front lens unit B1, an aspherical surface may be used for this lens. Since the height of the pupil paraxial ray in the lens on the image side is high in the rear lens unit B2, an aspherical surface may be used for this lens.

In the optical system according to each example, the lens on the object side of the front lens unit B1 has a positive refractive power on the optical axis and in the central area including the optical axis. The refractive power in the central area means the refractive power calculated from the radius of curvature of a circle determined by three points or an (on-axis) point on the optical axis and points with ±40% of the effective diameter. In wide-angle lenses, a lens with a negative power is often placed closest to the object, but each example is characterized in the paraxial focal length located in the standard lens range, and thus the aspherical lens located closes to the object has a positive power on the optical axis and in the central area. The aspherical lens has a paraxial refractive power of a positive refractive power.

Since the lens located closest to the object has a positive refractive power in this way, the principal point position of the front lens unit B1 can be positioned on the object side, which is advantageous for a compact optical system. In addition, the reduced diameter of the diaphragm SP by the positive refractive power is also advantageous in terms of mechanism.

In the optical system according to each example, the front lens unit B1 includes 3 or 4 lenses. The lens located closest to the object in the front lens unit B1 is an aspherical lens as described above. The aspherical lens has an aspherical surface on the object side. In this aspherical surface, an off-axis radius of curvature is larger than an on-axis radius of curvature. This aspherical surface can reduce a positive refractive power of the aspherical lens from the center to the periphery, and can significantly generate a barrel-shaped distortion.

The image-side surface of the aspherical lens may also be an aspherical surface. In the optical systems according to Examples 1 to 4, the surface of the aspherical lens on the image side is an aspherical surface.

In each example, the aspherical surface on the object side of the aspherical lens has a spherical shape in which the reference spherical surface is convex toward the object side. In the sectional view, the reference spherical surface is a circle determined by three points, i.e., the on-axis point and points having ±100% of the effective diameter. If the object-side surface is spherical and the distortion is controlled by the aspherical image-side surface, the periphery has a deep concave shape, which makes it difficult to manufacture a mold for molding the aspherical lens.

In Examples 1, 3 and 6, glass is used as a material for the aspherical lens. The glass aspherical lens can suppress thermal shape changes to a small extent, and thus environmental changes in the optical performance of the optical system. Examples 2, 4, and 5 use a resin as a material for the aspherical lens. The resin aspherical lens can make the optical system lighter and improve the impact resistance.

A negative lens and one or two lenses having a totally positive refractive power are disposed on the image side of the aspherical lens closest to the object in the front lens unit B1. Since the lens having a positive refractive power also has a role of cutting the under portion in the imaging light beam, it may be disposed near the diaphragm SP.

In each example, the rear lens unit B2 includes 4 or 5 lenses. Two aspherical lenses are disposed closest to the image side of the rear lens unit B2. As a distortion correcting amount becomes larger, it becomes difficult to correct the distortion only with the front lens unit B1 and thus an aspherical lens is used for a lens near the image plane where the pupil paraxial ray is highest in the rear lens unit B2. The aspherical surface is disposed on the image side of the diaphragm SP, and has an aspherical shape in which the positive refractive power becomes stronger.

As the material of the aspherical lens of the rear lens unit B2, glass or resin is used for the same reason as that of the aspherical lens of the front lens unit B1. In Examples 5 and 6, the refractive powers of the two aspherical lenses have opposite signs. Thereby, it is possible to cancel the focal changes due to the change in shape or refractive index due to heat and/or moisture absorptions.

Two or three spherical lenses are disposed between the diaphragm SP and the aspherical lens of the rear lens unit B2. Among these lenses, a low-dispersion lens having an Abbe number of more than 70 may be used for the lens having a positive refractive power. Thereby, the longitudinal chromatic aberration can be satisfactorily corrected. A lens having a high refractive index and high dispersion can be used for a lens having a negative refractive power. Thereby, the curvature of field and lateral chromatic aberration can be satisfactorily corrected.

In order to use the standard lens as described above to generate a large barrel-shaped distortion and to increase the imaging magnification of the object in the central area while enabling imaging at a wide angle of view, the aspherical lens closest to the object needs to be properly set. More specifically, an aspherical surface is disposed at a position away from the diaphragm SP so as to effectively control the distortion. This is because the height of the paraxial ray of the pupil becomes high at a position away from the diaphragm SP, so that the distortion can be easily controlled. In order to increase the barrel-shaped distortion, the surface on the object side of the diaphragm SP is provided with an aspherical shape in which the local radius of curvature at the periphery is larger than the radius of curvature at the center. In particular, in order to capture an image at a wide angle of view exceeding 100° in the horizontal direction as in each example, it is necessary to generate the distortion of −60% or less in the horizontal angle of view. In order to compress and capture the object image in the periphery in this way, the aspherical surface has a shape that changes sharply in the periphery.

In order to properly make these settings, the optical system according to each embodiment satisfies the following expressions:

$$0.45 \leq D1s/L \leq 0.65 \quad (1)$$

$$2.6 \leq Dr8/Dr4 \leq 30.0 \quad (2)$$

where D1s is a distance on the optical axis from the aspherical surface on the object side in the aspherical lens closest to the object in the front lens unit B1 to the diaphragm SP, L is an overall total optical length of the optical system, and Dr4 and Dr8 are sag amounts from the reference spherical surface at the positions of 40% and 80% of the effective diameter on the aspherical surface, respectively.

The conditional expression (1) indicates a condition that should be satisfied when the position of the aspherical surface on the object side of the aspherical lens relative to the diaphragm SP is normalized by the overall optical length of the optical system. When D1s/L is lower than the lower limit in the conditional expression (1), the distance from the diaphragm SP to the aspherical surface is too short, the height of the pupil paraxial ray on the aspherical surface becomes low, and it is difficult to effectively control the distortion. On the other hand, when D1s/L is higher than the upper limit in the conditional expression (1), the distance from the diaphragm SP to the aspherical surface becomes too long, the diameter of the aspherical lens increases, the optical system becomes large, or it becomes difficult to manufacture the aspherical lens.

The conditional expression (2) shows a satisfactory relationship between an aspherical amount having 40% of the effective diameter and an aspherical amount having 80% of the effective diameter in the aspherical surface. When Dr8/Dr4 is lower than the lower limit in the conditional expression (2), the aspherical amount having 80% of the effective diameter becomes too small relative to the aspherical amount having 40% of the effective diameter, and it becomes difficult to generate a large distortion amount in the periphery and thus to capture an image at a wide angle of view. On the other hand, when Dr8/Dr4 is higher than the upper limit in the conditional expression (2), the aspherical amount having 80% of the effective diameter becomes too large relative to the aspherical amount having 40% of the effective diameter, the aspherical shape tends to have a shape with an inflection point, and it becomes difficult to manufacture the aspherical lens. Satisfying these conditions can realize an optical system capable of capturing an image at a wide angle of view while increasing the imaging magnification of the object in the central area of the angle of view.

The numerical ranges of the conditional expressions (1) and (2) may be set as follows.

$$0.45 \leq D1s/L \leq 0.62 \quad (1a)$$

$$2.6 \leq Dr8/Dr4 \leq 15.0 \quad (2a)$$

The numerical ranges of the conditional expressions (1) and (2) may be set as follows.

$$0.45 \leq D1s/L \leq 0.59 \quad (1b)$$

$$2.6 \leq Dr8/Dr4 \leq 9.0 \quad (2b)$$

The optical system according to each example may further satisfy at least one of the following conditional expressions (3) to (9):

$$0.3 \leq refR1/D1s \leq 1.0 \quad (3)$$

$$-2.0 \leq \Delta P08/P00 \leq -0.5 \quad (4)$$

$$-0.2 \leq (refR1-refR2)/(refR1+refR2) \leq 0.2 \quad (5)$$

$$0.38 \leq D2s/L \leq 0.60 \quad (6)$$

$$-0.7 \leq Y/f \tan \omega - 1 < -1.0 \quad (7)$$

$$0.03 \leq |Dr8/refR1| \leq 0.08 \quad (8)$$

$$3.0 \leq L/f \leq 6.0 \quad (9)$$

In the conditional expressions (3) to (9), refR1 and refR2 are radius of curvature of the reference spherical surface of the aspherical surface on the object side and the reference spherical surface of the aspheric surface on the image side of the aspherical lens closest to the object in the front lens unit B1, respectively. D2s is a distance from the image-side surface of the aspherical lens disposed closest to the object in the front lens unit B1 to the diaphragm SP. f is the focal length of the overall optical system, Y is a maximum image height in the image plane IP, and ω is an actual angle of view (°) as the maximum imageable angle of view. P00 is an on-axis refractive power of the aspherical lens, and P08 is the refractive power of 80% of the effective diameter of the aspherical lens. The refractive power of 80% of the effective diameter is a refractive power calculated from local radii of curvature at the points of 80% of the effective diameter of the object-side surface and the image-side surface, a distance (interval) between these points, and the refractive index of the glass. ΔP08 is a difference (P08−P00) between the on-axis refractive power of the aspherical lens and the refractive power of 80% of the effective diameter.

The conditional expression (3) indicates a condition that may be satisfied because the light beam concentrically enters the aspherical surface in the relationship between the radius of curvature of the reference spherical surface of the aspherical surface on the object side of the aspherical lens and the position from the diaphragm SP. If refR1/D1s is lower than the lower limit in the conditional expression (3), the radius of curvature of the reference spherical surface becomes too small, it becomes difficult to secure the edge of the aspherical lens, or the sag of the aspherical surface becomes so large that it becomes difficult to manufacture a mold. On the other hand, when refR1/D1s is higher than the upper limit in the conditional expression (3), the radius of curvature of the reference spherical surface becomes too large, and the incident angle of the imaging light beam on the surface normal of the aspherical surface becomes large. Hence, the curvature of field is greatly generated on this aspherical surface, and it is difficult to correct the curvature of field.

The conditional expression (4) indicates a condition that the refractive power at the center and the refractive power at the periphery (80% of the effective diameter) of the aspherical lens may satisfy. In each example, it is necessary to increase the negative refractive power in the periphery in order to generate a large barrel-shaped distortion in the periphery. When ΔP08/P00 is lower than the lower limit in the conditional expression (4), the negative refractive power in the periphery becomes too strong, it is consequently necessary to increase the sag amount of the aspherical lens, and it becomes difficult to manufacture the aspherical lens. On the other hand, if ΔP08/P00 is higher than the upper limit of the conditional expression (4), the negative refractive power in the periphery becomes too weak to generate the distortion, and it becomes difficult to capture an image at a wide angle of view.

The conditional expression (5) indicates a condition which the shape factor of the aspherical lens may satisfy. If (refR1−refR2)/(refR1+refR2) is lower than the lower limit in the conditional expression (5), the radius of curvature of the reference spherical surface of the aspherical surface on the object side becomes too small, it becomes difficult to secure the edge of the aspherical lens, or the aspherical sag becomes so large that it becomes difficult to manufacture the mold. When (refR1−refR2)/(refR1+refR2) is higher than the upper limit in the conditional expression (5), the radius of curvature of the reference spherical surface becomes large, the incident angle of the imaging light beam relative to the surface normal of the aspherical surface becomes too large, a large curvature of field is generated on the aspherical surface, and it is difficult to correct the curvature of field.

The conditional expression (6) indicates a condition that may be satisfied when the position of the image-side surface of the aspherical lens relative to the diaphragm SP is normalized by the overall optical length of the optical system. In order to correct the distortion, not only the object-side surface but also the image-side surface may be disposed at positions with high heights of the pupil paraxial ray. When D2s/L is lower than the lower limit in the conditional expression (6), a distance from the diaphragm SP to the image-side surface becomes too small, the height of the pupil paraxial ray becomes low, and it becomes difficult to effectively control the distortion. On the other hand, when D2s/L is higher than the upper limit in the conditional expression (6), the distance from the diaphragm SP to the image-side surface becomes too large, the diameter of the aspherical lens consequently increases, and the optical system becomes large.

The conditional expression (7) indicates a condition which a ratio of an actual image height to an ideal image height, or a distortion amount may satisfy. If Y/f tan ω−1 is lower than a lower limit in the conditional expression (7), the distortion amount is too small to capture an image at a wide angle of view.

The conditional expression (8) shows a condition that may be satisfied when the aspherical amount in the periphery of the aspherical surface on the object side (80% of the effective diameter) is normalized by the radius of curvature of the reference spherical surface. If Dr8/refR1 is lower than the lower limit in the conditional expression (8), the aspherical amount in the periphery becomes too small, and it becomes difficult to generate the distortion and to capture an image at a wide angle of view. On the other hand, if Dr8/refR1 is higher than the upper limit in the conditional expression (8), the aspherical amount in the periphery becomes too large, the aspherical surface has an inflection point, and it becomes difficult to manufacture the aspherical lens.

The conditional expression (9) indicates a condition which a ratio (telephoto ratio) between the overall optical length of the optical system and the focal length may satisfy. The optical system according to each example is characterized in that the focal length is longer than that of a normal wide-angle lens, and the telephoto ratio is small. If L/f is lower than the lower limit in the conditional expression (9), the overall optical length becomes too short, it is necessary to increase the refractive power of each lens, and consequently it becomes difficult to correct various aberrations. On the other hand, if L/f exceeds the upper limit of the conditional expression (9), the overall optical length becomes too large and the optical system becomes large.

The numerical ranges of the conditional expressions (3) to (9) may be set as follows:

$$0.45 \leq refR1/D1s \leq 0.70 \tag{3a}$$

$$-1.9 \leq \Delta P08/P00 \leq -0.9 \tag{4a}$$

$$-0.24 \leq (refR1-refR2)/(refR1+refR2) \leq 0.22 \tag{5a}$$

$$0.39 \leq D2s/L \leq 0.54 \tag{6a}$$

$$0.78 \leq Y/f \tan \omega - 1 \leq 0.92 \tag{7a}$$

$$0.03 \leq |Dr8/refR1| \leq 0.06 \tag{8a}$$

$$4.5 \leq L/f \leq 5.9 \tag{9a}$$

Focusing may be performed by moving all or part of the optical system according to each example in the optical axis direction. An image stabilization for reducing or correcting image blurs according to the camera shake during handheld imaging and the vibration of the vehicle body mounted with the in-vehicle camera may be made by moving all or part of the optical system in the direction orthogonal to the optical axis (parallel shifting or rotating around a point on the optical axis).

Next follows Numerical Examples 1 to 6 corresponding to each of Examples 1 to 6 will be shown. Each numerical example is described based on the in-focus state at infinity. In each numerical example, ri is a radius of curvature (mm) of an i-th surface from an object side, di is a lens thickness or air spacing (mm) between the i-th and (i+1)-th surfaces, and ndi is a refractive index of a material of an i-th optical element member for the d-line. νdi is an Abbe number of the material of the i-th optical element for the d-line. The Abbe number νd is expressed as νd=(Nd−1)/(NF−NC), where Nd, NF, and NC are refractive indexes of the d-line (587.6 nm), F-line (486.1 nm), and C-line (656.3 nm) in the Fraunhofer line.

A paraxial angle of view is an angle of view calculated by the relationship of Y=f·tan ω where f is a focal length and Y is a maximum image height of the optical system. The actual angle of view is an incident angle on the object side of the light beam that reaches the maximum image height Y through the optical system. If there is no distortion, the paraxial angle of view and the actual angle of view are almost equal to each other, but if the distortion is large, the paraxial angle of view and the actual angle of view are different from each other. BF represents a backfocus (mm). "Backfocus" refers to a distance on the optical axis from a final surface of the optical system (the lens surface closest to the image plane) to the paraxial image plane in terms of air equivalent length. The "overall lens length" is a distance on the optical axis from the frontmost surface (lens surface closest to the object) of the optical system to the final surface of the optical system. The overall optical length L is a sum of the overall length of the lens and the backfocus, and a distance on the optical axis from the frontmost surface of the optical system to the paraxial image plane expressed by the air equivalent length.

"*" attached to a surface number means that the surface has an aspherical shape. The aspherical shape is expressed as follows:

$$x=(h^2/R)/[1+[1-(1+k)(h/R)^2]^{1/2}]+A4h^4+A6h^6+A8h^8+A10h^{10}$$

where x is a position in the optical axis direction, h is a height in a direction orthogonal to the optical axis, a light traveling direction is set positive, R is a paraxial radius of curvature, k is a conical constant, and A4, A6, A8, and A10 are paraxial coefficients. "EZ" in the aspherical coefficient means "$\times 10^{-Z}$".

In the numerical example, the last two surfaces are the surfaces of optical blocks such as filters and face plates.

The values corresponding to the above conditional expressions (1) to (9) in Examples (Numerical Examples) 1 to 6 are summarized in Table 1.

FIGS. 2, 4, 6, 8, 10, and 12 are aberration diagrams of the optical system according to Examples 1 to 6 at an object distance of 300 m, respectively. In the spherical aberration diagram, Fno indicates an F-number, a solid line indicates a spherical aberration for the d-line (wavelength 587.6 nm), and an alternate long and short two dashes line indicates a spherical aberration for the g-line (wavelength 435.8 nm). In the astigmatism diagram, a solid line S indicates a sagittal image plane, and a broken line M indicates a meridional image plane. A distortion diagram shows the distortion for the d-line. A chromatic aberration diagram shows a lateral chromatic aberration for a g-line. ω is an actual angle of view (°).

NUMERICAL EXAMPLE 1
Unit: mm
Surface Data

| Surface No. | r | d | nd | vd | Effective Diameter |
|---|---|---|---|---|---|
| 1* | 14.124 | 2.30 | 1.55332 | 71.7 | 25.60 |
| 2* | 20.260 | 6.75 | | | 20.40 |
| 3 | −143.700 | 0.80 | 1.58144 | 40.8 | 15.30 |
| 4 | 7.535 | 11.88 | | | 11.30 |
| 5 | 3213.533 | 1.00 | 1.77250 | 49.6 | 6.40 |
| 6 | −15.743 | 4.09 | | | 6.50 |
| 7 (Diaphragm) | ∞ | 4.11 | | | 6.12 |
| 8 | 11.989 | 1.63 | 1.53775 | 74.7 | 5.80 |
| 9 | −20.825 | 5.43 | | | 5.60 |
| 10 | −6.237 | 0.42 | 1.92286 | 18.9 | 7.50 |
| 11 | −512.318 | 0.12 | | | 9.00 |
| 12 | 24.845 | 3.84 | 1.76802 | 49.2 | 11.30 |
| 13* | −51.714 | 0.10 | | | 12.40 |
| 14* | 9.398 | 3.17 | 1.85135 | 40.1 | 13.10 |
| 15* | 4174.072 | 2.37 | | | 13.20 |
| 16 | ∞ | 1.00 | 1.51633 | 64.1 | 12.00 |
| 17 | ∞ | 1.00 | | | 20.00 |
| Image Plane | ∞ | | | | |

ASPHERIC DATA

1st Surface

K = 0.00000e+000 A4 = 1.23948e−004 A6 = −1.33403e−006
2nd Surface

K = 0.00000e+000 A4 = 2.82836e−004 A6 = −2.77424e−006
A8 = 1.95302e−008

13th Surface

K = 0.00000e+000 A4 = −1.03701e−003 A6 = 8.02917e−006
14th Surface

K = 0.00000e+000 A4 = −5.64284e−004 A6 = −3.65221e−006
15th Surface

K = 0.00000e+000 A4 = −5.71632e−004 A6 = 5.27690e−006

VARIOUS DATA

| | |
|---|---|
| Focal Length: | 10.20 |
| F-NUMBER: | 2.47 |
| Paraxial Angle of View: (°) | 27.02 |
| Actual Angle of View: (°) | 70.54 |
| Image Height: | 5.20 |
| Overall Lens Length: | 45.64 |
| BF | 4.03 |

NUMERICAL EXAMPLE 2
UNIT: mm
Surface Data

| Surface No. | r | d | nd | vd | Effective Diameter |
|---|---|---|---|---|---|
| 1* | 15.211 | 2.50 | 1.49171 | 57.4 | 26.00 |
| 2* | 22.019 | 8.09 | | | 20.60 |
| 3 | −184.149 | 3.00 | 1.67270 | 32.1 | 13.50 |
| 4 | 6.662 | 9.47 | | | 9.00 |
| 5 | 73.659 | 1.03 | 1.87070 | 40.7 | 5.80 |
| 6 | −15.158 | 4.34 | | | 5.80 |
| 7(Diaphragm) | ∞ | 3.10 | | | 5.25 |
| 8 | 14.557 | 1.41 | 1.49700 | 81.5 | 4.90 |
| 9 | −15.016 | 4.19 | | | 4.70 |
| 10 | −6.284 | 0.46 | 1.95906 | 17.5 | 6.40 |
| 11 | −28.261 | 1.19 | | | 7.30 |
| 12* | 111.969 | 2.81 | 1.53160 | 55.8 | 8.90 |
| 13* | −6.079 | 0.10 | | | 9.90 |
| 14* | 60.016 | 4.00 | 1.53160 | 55.8 | 12.30 |
| 15* | 788.576 | 2.38 | | | 12.30 |
| 16 | ∞ | 1.00 | 1.51633 | 64.1 | 20.00 |
| 17 | ∞ | 1.00 | | | 20.00 |
| Image Plane | ∞ | | | | |

ASPHERIC DATA

1st Surface

K = 0.00000e+000 A4 = 4.94983e−005 A6 = −7.98981e−007
2nd Surface

K = 0.00000e+000 A4 = 1.87777e−004 A6 = −1.69133e−006
A8 = 1.57584e−008
12th Surface K = 5.07374e+002 A4 = −1.43699e−003 A6 = 1.18112e−005
13th Surface K = 0.00000e+000 A4 = −1.87271e−004 A6 = 2.43586e−005
14th Surface K = 0.00000e+000 A4 = 6.77818e−005 A6 = 8.73334e−006
15th Surface K = 0.00000e+000 A4 = −2.43181e−003 A6 = 3.81106e−005

VARIOUS DATA

| | |
|---|---|
| Focal Length: | 10.19 |
| F-NUMBER: | 2.88 |
| Paraxial Angle of View: (°) | 27.03 |
| Actual Angle of View: (°) | 73.85 |
| Image Height: | 5.20 |

-continued

| | | |
|---|---|---|
| Overall Lens Length: | | 45.67 |
| BF | | 4.04 |

NUMERICAL EXAMPLE 3
UNIT: mm
Surface Data

| Surface No. | r | d | nd | vd | Effective Diameter |
|---|---|---|---|---|---|
| 1* | 10.941 | 3.00 | 1.55332 | 71.7 | 20.10 |
| 2* | 33.254 | 4.57 | | | 18.50 |
| 3 | 48.223 | 0.80 | 2.00100 | 29.1 | 11.80 |
| 4 | 5.316 | 9.16 | | | 8.40 |
| 5 | 32.237 | 0.50 | 1.90366 | 31.3 | 4.80 |
| 6 | 8.497 | 1.74 | 1.67270 | 32.1 | 4.60 |
| 7 | −9.508 | 2.91 | | | 4.80 |
| 8(Diaphragm) | ∞ | 2.74 | | | 4.48 |
| 9 | 35.331 | 2.05 | 1.49700 | 81.5 | 4.30 |
| 10 | −9.796 | 2.42 | | | 4.80 |
| 11 | −15.369 | 4.60 | 1.49700 | 81.5 | 6.00 |
| 12 | −4.496 | 0.91 | 2.00272 | 19.3 | 7.40 |
| 13 | −15.623 | 2.34 | | | 9.40 |
| 14 | 60.499 | 4.00 | 1.69350 | 53.2 | 13.80 |
| 15* | 147.527 | 0.10 | | | 14.80 |
| 16* | 9.263 | 3.52 | 1.76802 | 49.2 | 14.00 |
| 17* | 485.398 | 2.37 | | | 14.10 |
| 18 | ∞ | 1.00 | 1.51633 | 64.1 | 20.00 |
| 19 | ∞ | 1.00 | | | 20.00 |
| Image Plane | ∞ | | | | |

ASPHERIC DATA

1st Surface

K = 0.00000e+000 A4 = 3.29512e−004 A6 = −1.74347e−006
A8 = −5.39848e−008 A10 = 3.85932e−010

2nd Surface

K = 0.00000e+000 A4 = 8.52223e−004 A6 = −1.67993e−005
A8 = 1.70580e−007 A10 = −4.79887e−010

15th Surface

K = 0.00000e+000 A4 = −8.82748e−004 A6 = 3.74824e−006

16th Surface

K = 0.00000e+000 A4 = −4.75110e−005 A6 = −1.27201e−005

17th Surface

K = 0.00000e+000 A4 = −5.23871e−004 A6 = 2.35842e−006

VARIOUS DATA

| | |
|---|---|
| Focal Length: | 10.21 |
| F-NUMBER: | 3.50 |
| Paraxial Angle of View: (°) | 27.00 |
| Actual Angle of View: (°) | 69.58 |
| Image Height: | 5.20 |
| Overall Lens Length: | 45.34 |
| BF | 4.03 |

NUMERICAL EXAMPLE 3
UNIT: mm
Surface Data

| Surface No. | r | d | nd | vd | Effective Diameter |
|---|---|---|---|---|---|
| 1* | 11.053 | 3.50 | 1.53160 | 55.8 | 20.00 |
| 2* | 29.092 | 3.54 | | | 16.50 |
| 3 | 75.292 | 2.90 | 2.00100 | 29.1 | 14.10 |
| 4 | 6.864 | 8.58 | | | 9.20 |
| 5 | 27.784 | 0.50 | 1.83481 | 42.7 | 5.20 |
| 6 | 8.223 | 0.10 | | | 4.90 |
| 7 | 9.912 | 2.17 | 1.59270 | 35.3 | 4.90 |
| 8 | −9.576 | 2.96 | | | 4.50 |
| 9(Diaphragm) | ∞ | 1.73 | | | 4.39 |
| 10 | 11.755 | 2.35 | 1.49700 | 81.5 | 4.40 |
| 11 | −8.572 | 3.94 | | | 4.20 |
| 12 | −4.812 | 1.40 | 1.95906 | 17.5 | 5.50 |
| 13 | −19.811 | 0.10 | | | 7.20 |
| 14 | 20.630 | 4.00 | 1.53160 | 55.8 | 8.60 |
| 15* | −117.854 | 0.10 | | | 10.00 |
| 16 | 6.463 | 2.48 | 1.53160 | 55.8 | 10.10 |
| 17* | 2532.550 | 2.37 | | | 10.40 |
| 18 | ∞ | 1.00 | 1.51633 | 64.1 | 10.50 |
| 19 | ∞ | 1.00 | | | 20.00 |
| Image Plane | ∞ | | | | |

ASPHERIC DATA

1st Surface

K = 0.00000e+000 A4 = −7.28068e−006 A6 = 1.17264e−006
A8 = 1.26655e−008 A10 = −3.07829e−010

2nd Surface

K = 0.00000e+000 A4 = 2.15124e−004 A6 = 5.25881e−006
A8 = −6.21104e−008 A10 = 4.63043e−010

15th Surface

K = 0.00000e+000 A4 = −2.84723e−003 A6 = 2.80342e−005

16th Surface

K = 0.00000e+000 A4 = −2.24242e−003 A6 = −2.60492e−005

17th Surface

K = 0.00000e+000 A4 = −2.21403e−003 A6 = 3.30765e−005

VARIOUS DATA

| | |
|---|---|
| Focal Length: | 10.19 |
| F-NUMBER: | 3.20 |
| Paraxial Angle of View: (°) | 27.03 |
| Actual Angle of View: (°) | 72.47 |
| Image Height: | 5.20 |
| Overall Lens Length: | 40.36 |
| BF | 4.03 |

NUMERICAL EXAMPLE 5
UNIT: mm
Surface Data

| Surface No. | r | d | nd | vd | Effective Diameter |
|---|---|---|---|---|---|
| 1* | 12.908 | 3.20 | 1.53160 | 55.8 | 22.60 |
| 2 | 29.617 | 2.56 | | | 20.30 |
| 3 | −96.090 | 7.00 | 1.91082 | 35.3 | 18.90 |
| 4 | 9.308 | 5.32 | | | 10.70 |
| 5 | −10.762 | 2.50 | 1.95906 | 17.5 | 9.40 |
| 6 | −9.795 | 9.08 | | | 10.00 |
| 7(Diaphragm) | ∞ | 5.20 | | | 8.10 |
| 8 | 9.205 | 3.22 | 1.49700 | 81.5 | 9.20 |
| 9 | −21.833 | 1.95 | | | 8.80 |
| 10 | 591.493 | 3.02 | 1.49700 | 81.5 | 8.40 |
| 11 | −6.666 | 1.00 | 2.00100 | 29.1 | 8.40 |
| 12 | −19.583 | 4.69 | | | 9.20 |
| 13* | 58.150 | 3.85 | 1.53160 | 55.8 | 10.50 |
| 14 | −7.163 | 1.14 | | | 12.30 |
| 15 | −9.145 | 2.04 | 1.53160 | 55.8 | 12.80 |
| 16* | 113.380 | 2.37 | | | 12.90 |
| 17 | ∞ | 1.00 | 1.51633 | 64.1 | 11.70 |
| 18 | ∞ | 1.00 | | | 20.00 |
| Image Plane | ∞ | | | | |

-continued

ASPHERIC DATA

1st Surface

K = 0.00000e+000 A4 = −4.99983e−005 A6 = 1.03483e−007
A8 = −1.26594e−008 A10 = 3.49551e−011

13th Surface

K = 0.00000e+000 A4 = −1.33407e−003 A6 = −2.82553e−005

15th Surface

K = 0.00000e+000 A4 = 1.61637e−003 A6 = −1.05133e−005

16th Surface

K = 0.00000e+000 A4 = −1.49039e−003 A6 = 1.54620e−005

VARIOUS DATA

| | |
|---|---|
| Focal Length: | 10.26 |
| F-NUMBER: | 2.06 |
| Paraxial Angle of View: (°) | 26.88 |
| Actual Angle of View: (°) | 68.57 |
| Image Height: | 5.20 |
| Overall Lens Length: | 55.76 |
| BF | 4.03 |

NUMERICAL EXAMPLE 6
UNIT: mm
Surface Data

| Surface No. | r | d | nd | vd | Effective Diameter |
|---|---|---|---|---|---|
| 1* | 14.188 | 3.20 | 1.76802 | 49.2 | 25.00 |
| 2 | 24.199 | 3.29 | | | 22.30 |
| 3 | −228.889 | 6.96 | 2.00100 | 29.1 | 21.10 |
| 4 | 10.020 | 8.81 | | | 12.70 |
| 5 | −18.328 | 2.50 | 1.92119 | 24.0 | 11.00 |
| 6 | −11.757 | 9.91 | | | 11.30 |
| 7(Diaphragm) | ∞ | 2.86 | | | 5.06 |
| 8 | 8.135 | 2.42 | 1.49700 | 81.5 | 5.20 |
| 9 | −24.121 | 1.42 | | | 5.40 |
| 10 | −38.446 | 4.00 | 1.49700 | 81.5 | 5.90 |
| 11 | −7.326 | 0.23 | | | 6.80 |
| 12 | −6.263 | 1.00 | 1.80810 | 22.8 | 6.80 |
| 13 | −46.926 | 1.95 | | | 7.70 |
| 14* | 111.969 | 3.81 | 1.76802 | 49.2 | 9.10 |
| 15* | −7.016 | 0.76 | | | 10.80 |
| 16* | −13.261 | 2.00 | 1.76802 | 49.2 | 11.60 |
| 17* | 544.894 | 2.37 | | | 12.20 |
| 18 | ∞ | 1.00 | 1.51633 | 64.1 | 20.00 |
| 19 | ∞ | 1.00 | | | 20.00 |
| Image Plane | ∞ | | | | |

ASPHERIC DATA

1st Surface

K = 0.00000e+000 A4 = −3.18124e−005 A6 = 3.93509e−008
A8 = −4.48875e−009 A10 = 4.72429e−012

14th Surface

K = 5.07374e+002 A4 = −1.43699e−003 A6 = 1.18112e−005

15th Surface

K = 0.00000e+000 A4 = 3.12230e−004 A6 = 1.59987e−005

16th Surface

K = 0.00000e+000 A4 = 1.04756e−003 A6 = −1.42433e−005

17th Surface

K = 0.00000e+000 A4 = −1.49533e−003 A6 = 1.20727e−005

-continued

VARIOUS DATA

| | |
|---|---|
| Focal Length: | 10.22 |
| F-NUMBER: | 2.88 |
| Paraxial Angle of View: (°) | 26.96 |
| Actual Angle of View: (°) | 74.15 |
| Image Height: | 5.20 |
| Overall Lens Length: | 55.12 |
| BF | 4.03 |

TABLE 1

| | Ex.1 | Ex.2 | Ex.3 | Ex.4 | Ex.5 | Ex.8 |
|---|---|---|---|---|---|---|
| f | 10.197 | 10.193 | 10.207 | 10.190 | 10.259 | 10.222 |
| Y | 5.199 | 5.200 | 5.200 | 5.200 | 5.199 | 5.200 |
| ω | 70.536 | 73.855 | 69.583 | 72.469 | 68.572 | 74.147 |
| D1s | 26.825 | 28.430 | 22.665 | 24.256 | 29.655 | 34.670 |
| D2s | 24.525 | 25.930 | 19.665 | 20.756 | 26.455 | 31.470 |
| L(inair) | 49.664 | 49.712 | 49.376 | 44.388 | 59.787 | 59.149 |
| Dr8 | −0.889 | −0.725 | 0.398 | −0.421 | 0.599 | −0.640 |
| Dr4 | −0.251 | −0.241 | −0.075 | −0.047 | −0.230 | −0.228 |
| refR1 | 17.400 | 19.785 | 10.939 | 11.693 | 18.356 | 19.238 |
| refR2 | 12.935 | 13.737 | 12.761 | 12.256 | 29.617 | 24.199 |
| P00 | 0.013 | 0.011 | 0.036 | 0.032 | 0.025 | 0.026 |
| P08 | −0.009 | 0.010 | 0.008 | 0.006 | 0.010 | 0.008 |
| ΔP08 (P08-P00) | −0.023 | −0.021 | −0.028 | −0.026 | −0.015 | −0.017 |
| (1) D1s/L | 0.540 | 0.572 | 0.459 | 0.546 | 0.496 | 0.586 |
| (2) Dr8/Dr4 | 3.534 | 3.005 | 5.286 | 8.917 | 2.605 | 2.804 |
| (3) refR1/D1s | 0.649 | 0.696 | 0.483 | 0.482 | 0.619 | 0.555 |
| (4) ΔP08/P00 | −1.684 | −1.897 | −0.774 | −0.805 | −0.614 | −0.667 |
| (5) (refR1 − refR2)/(refR1+refR2) | 0.147 | 0.180 | −0.077 | −0.024 | −0.235 | −0.114 |
| (6) D2s/L | 0.494 | 0.522 | 0.398 | 0.468 | 0.442 | 0.532 |
| (7) Y/ftan ω − 1 | −0.820 | −0.852 | −0.810 | −0.839 | −0.801 | −0.856 |
| (8) \|Dr8/refR1\| | 0.051 | 0.037 | 0.036 | 0.036 | 0.033 | 0.033 |
| (9) L/f | 4.870 | 4.877 | 4.837 | 4.356 | 5.828 | 5.786 |

Figure 1:
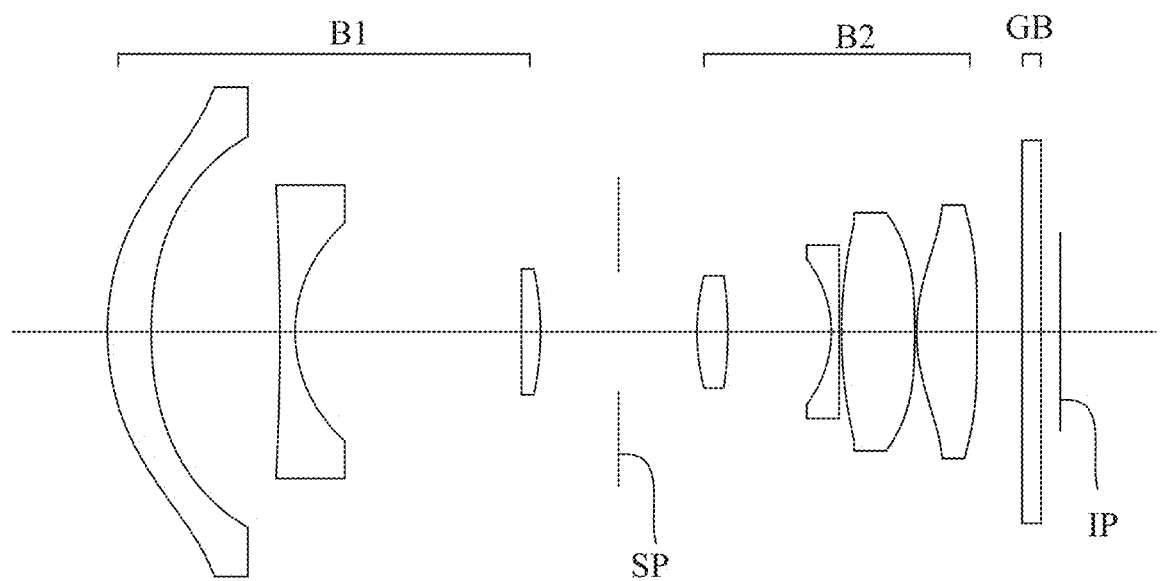
FIG. 1 is a sectional view of an optical system according to Example 1 of the present invention.
Figure 2:
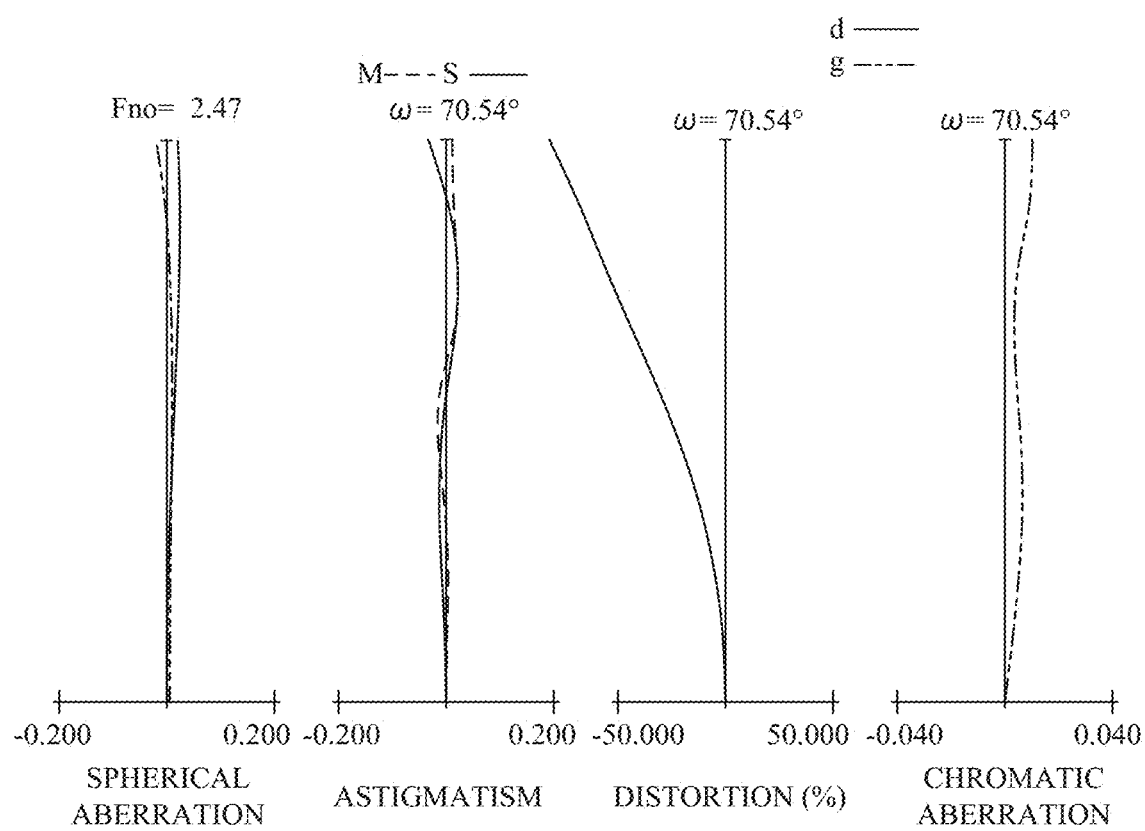
FIG. 2 is an aberration diagram of the optical system according to Example 1 at an object distance of 300 m.
Figure 3:
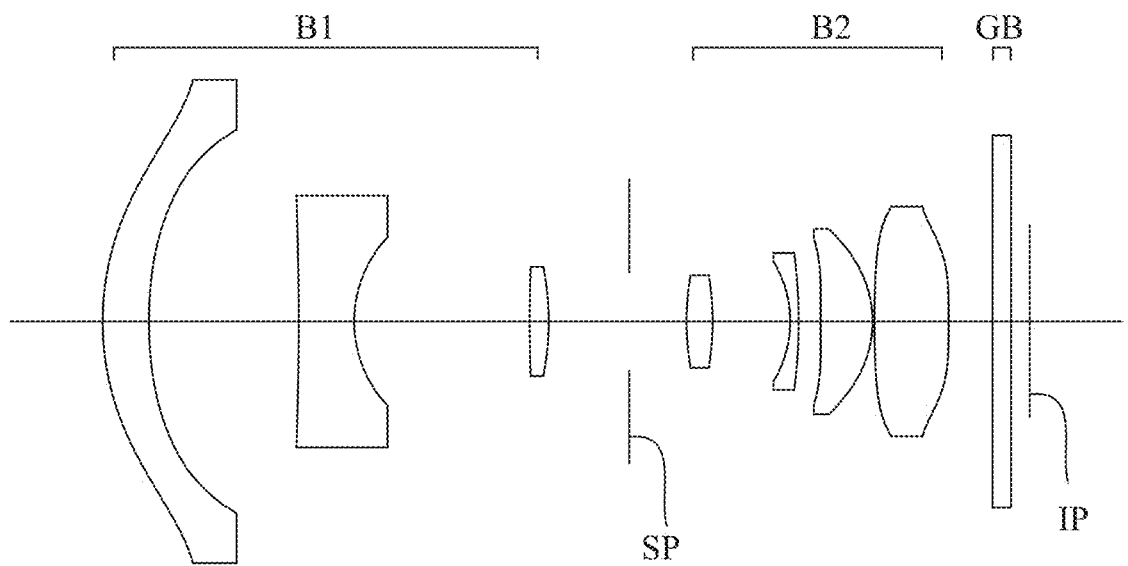
FIG. 3 is a sectional view of an optical system according to Example 2 of the present invention.
Figure 4:
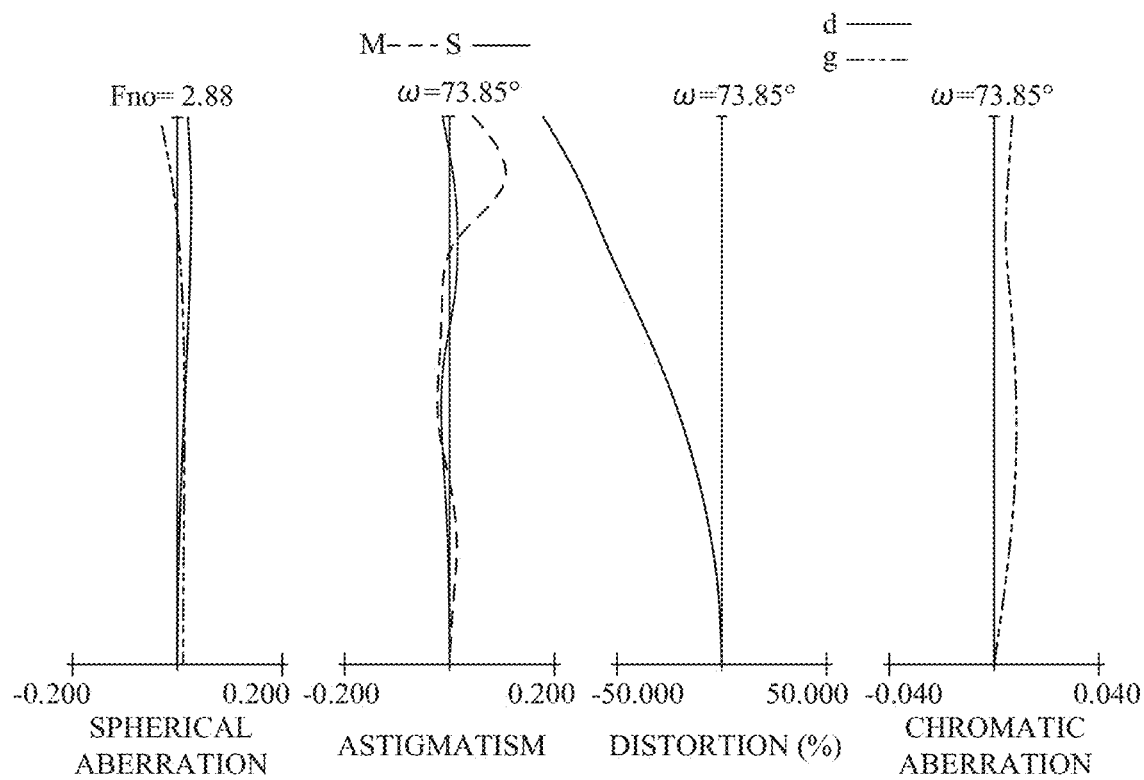
FIG. 4 is an aberration diagram of the optical system according to Example 2 at an object distance of 300 m.
Figure 5:
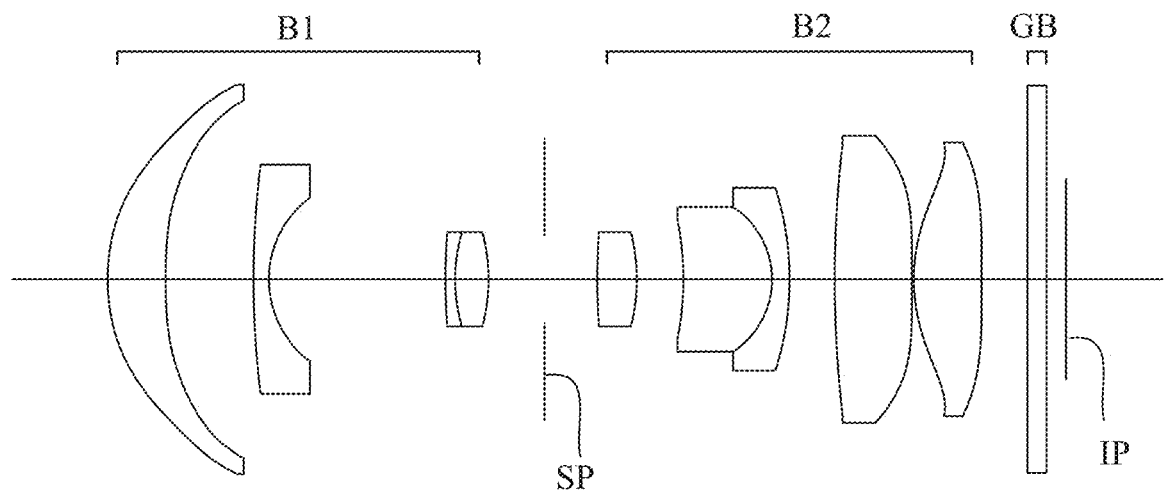
FIG. 5 is a sectional view of an optical system according to Example 3 of the present invention.
Figure 6:
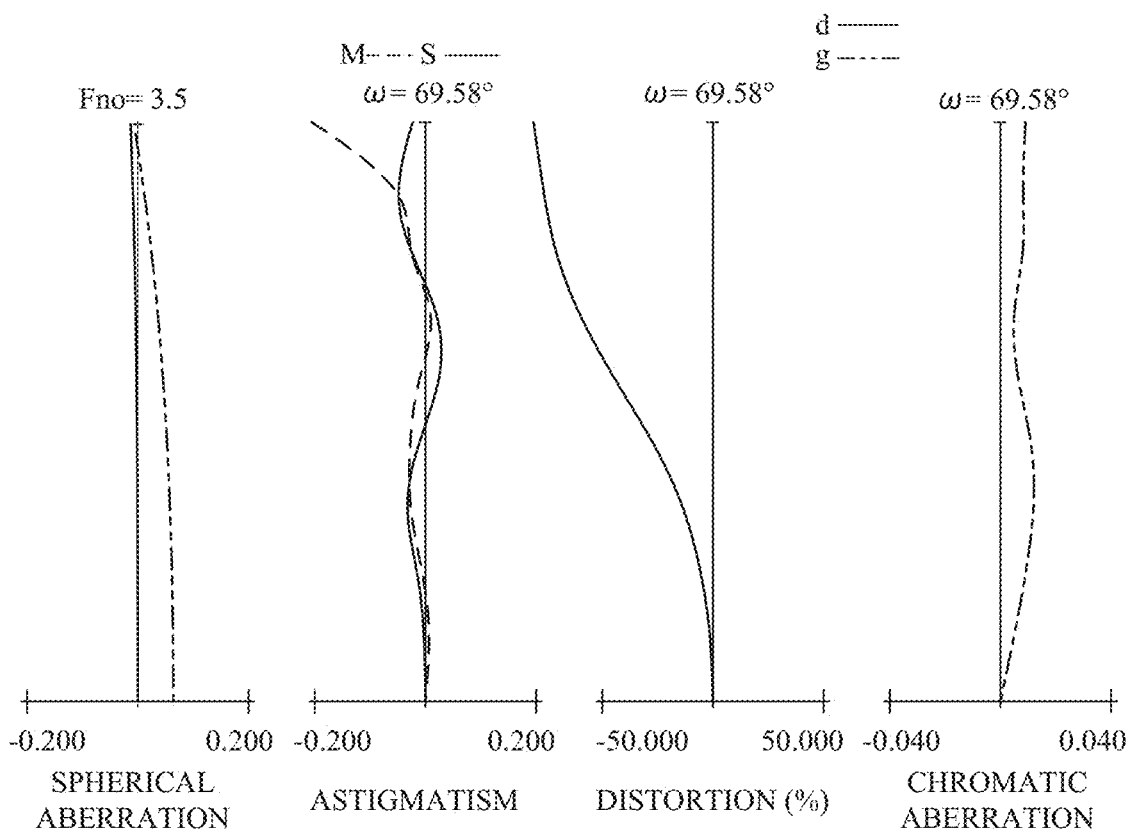
FIG. 6 is an aberration diagram of the optical system according to Example 3 at an object distance of 300 m.
Figure 7:
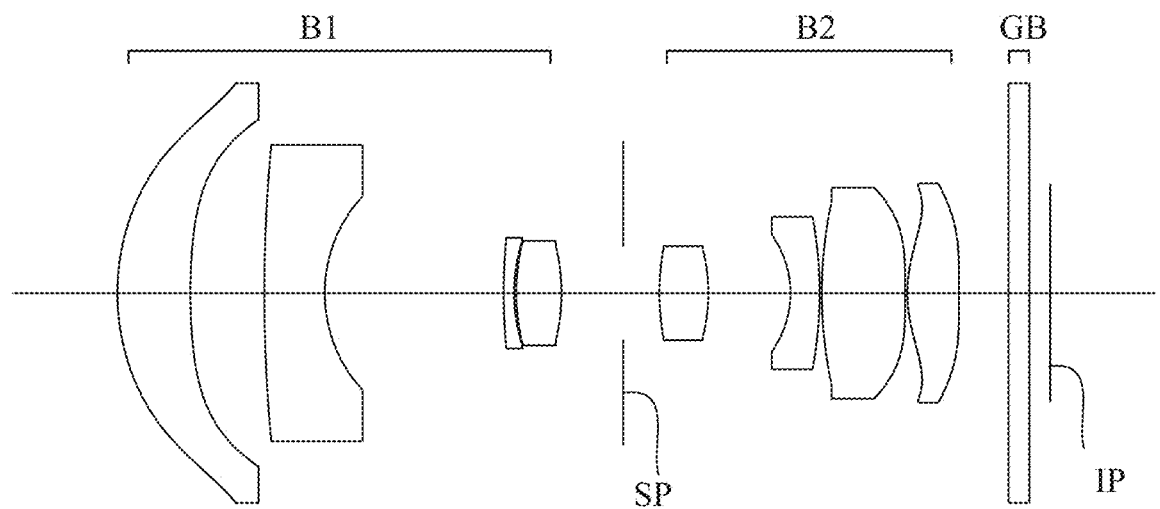
FIG. 7 is a sectional view of an optical system according to Example 4 of the present invention.
Figure 8:
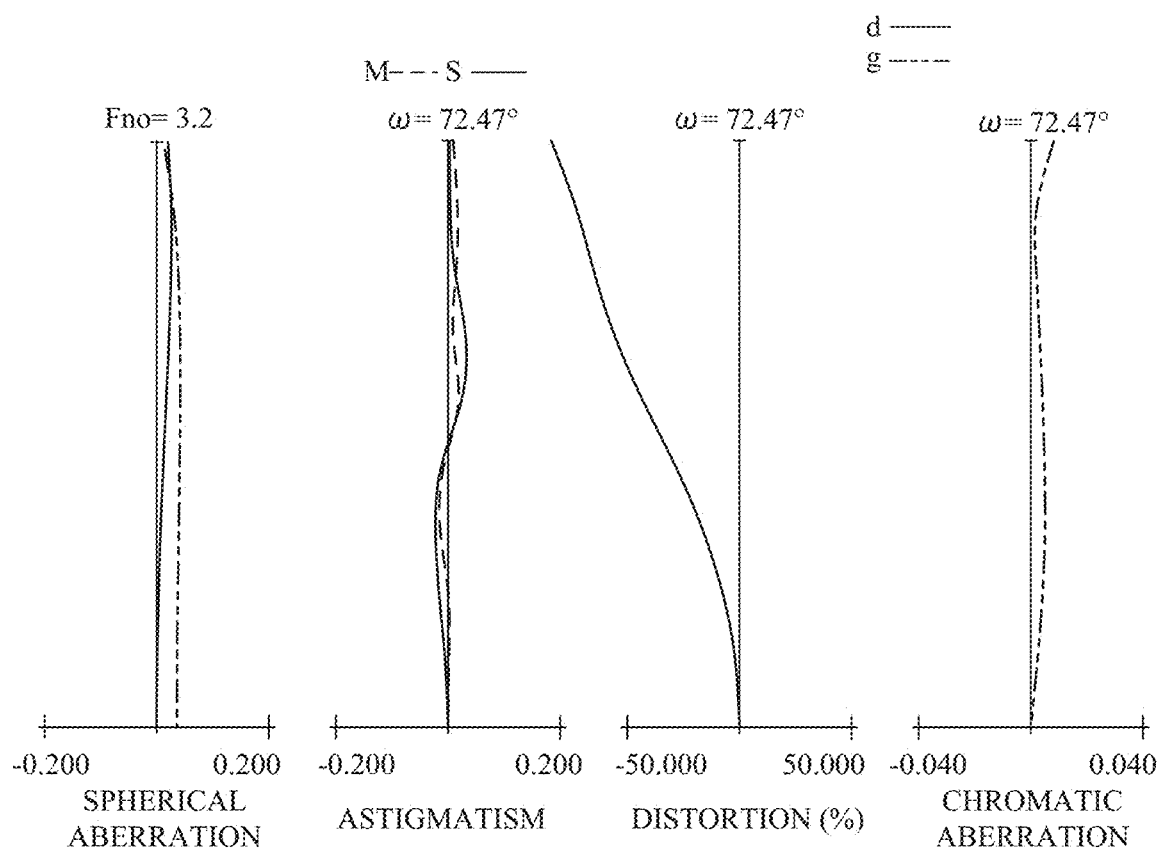
FIG. 8 is an aberration diagram of the optical system of Example 4 at an object distance of 300 m.
Figure 9:
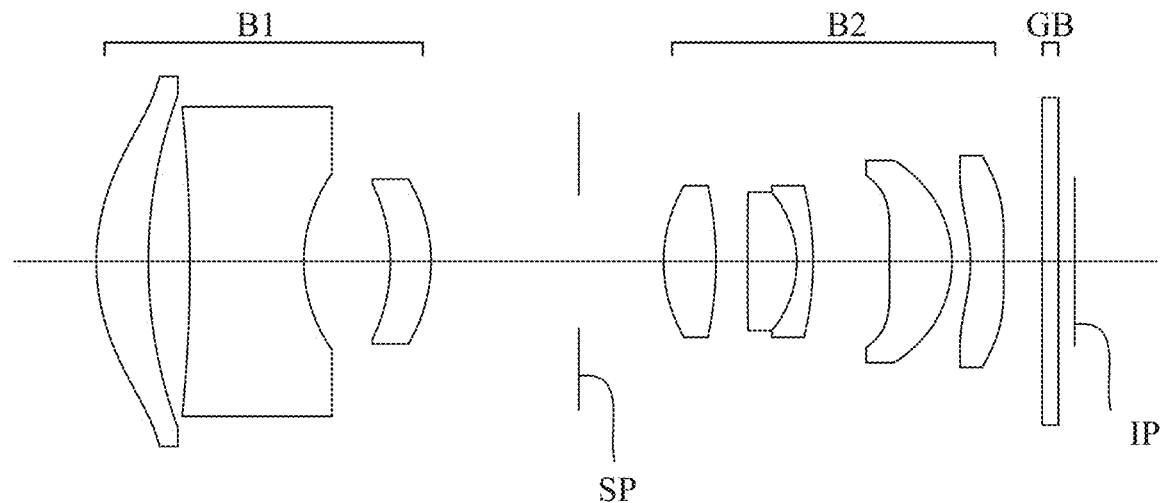
FIG. 9 is a sectional view of an optical system according to Example 5 of the present invention.
Figure 10:
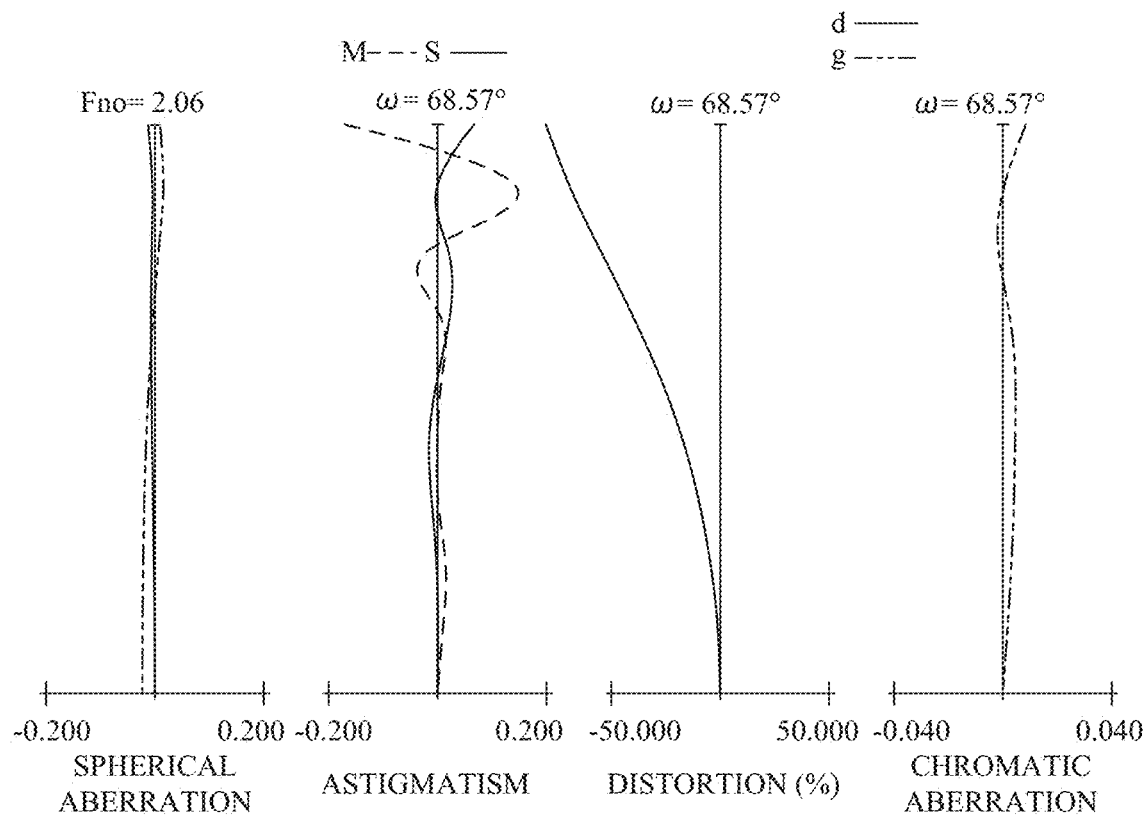
FIG. 10 is an aberration diagram of the optical system according to Example at an object distance of 300 m.
Figure 11:
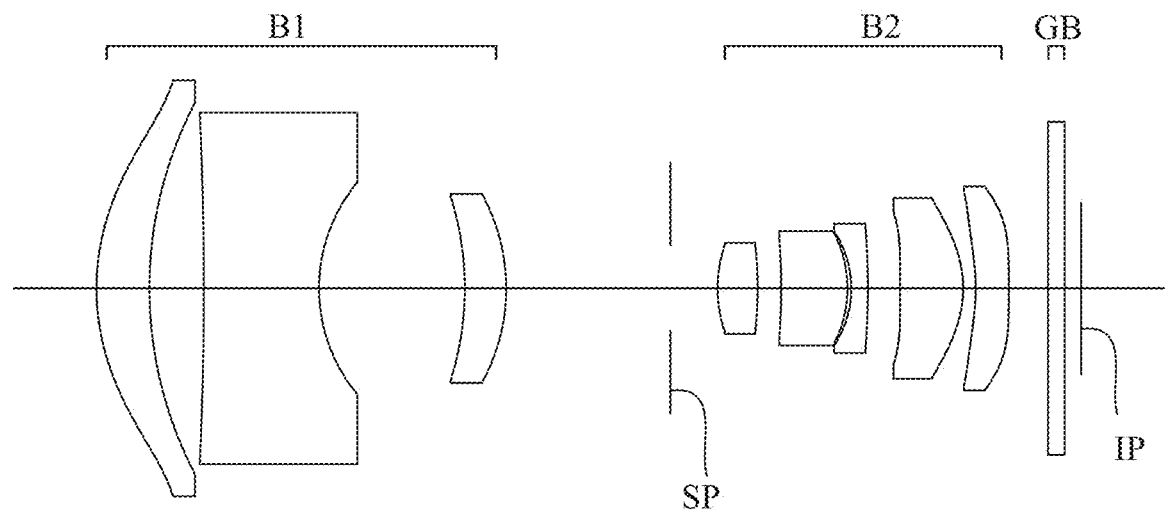
FIG. 11 is a sectional view of an optical system according to Example 6 of the present invention.
Figure 12:
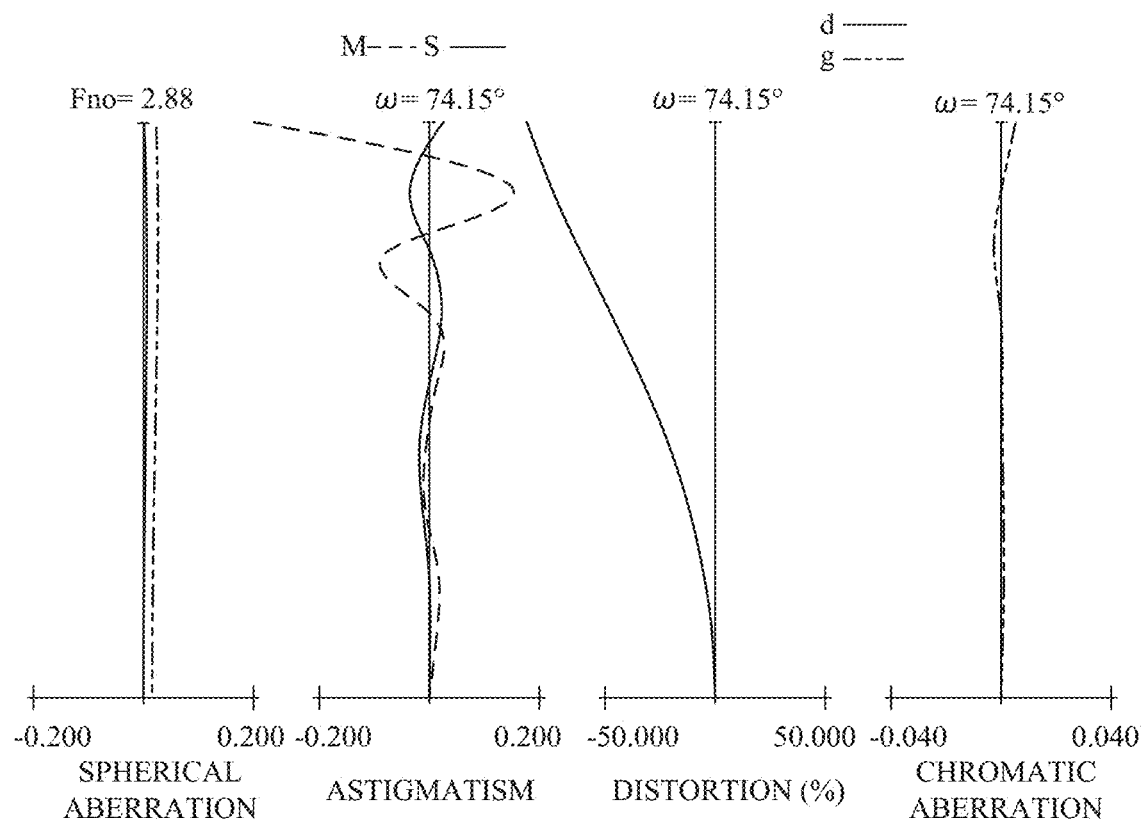
FIG. 12 is an aberration diagram of the optical system according to Example 6 at an object distance of 300 m.
Figure 13:
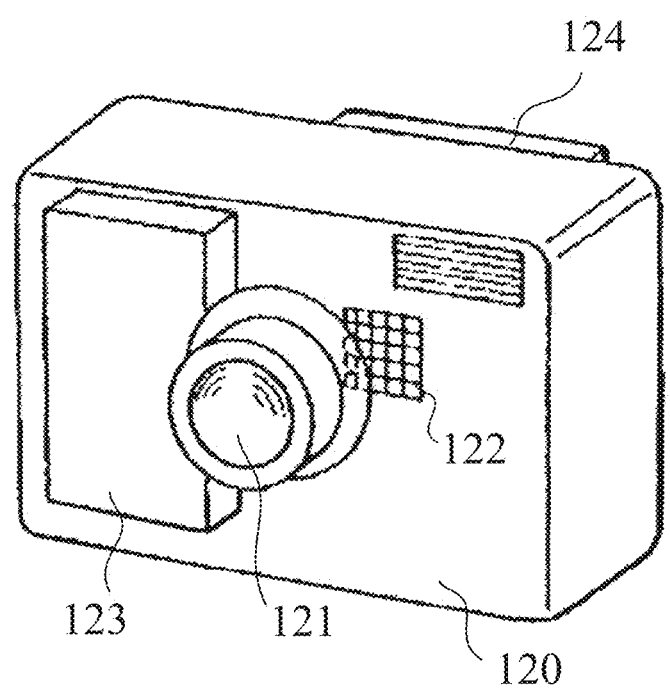
FIG. 13 is a schematic view of an image pickup apparatus using the optical system according to each example.

FIG. 13 illustrates a digital still camera that serves as an image pickup apparatus using the optical system according to each example. In FIG. 13, reference numeral 120 denotes a camera body, and reference numeral 121 denotes an optical system according to any one of Examples 1 to 6. Reference numeral 122 denotes an image sensor such as a CCD sensor or a CMOS sensor, which is built in the camera body and captures an object image formed by the optical system 121. Reference numeral 123 denotes a memory configured to record image data generated by using an imaging signal from the image sensor 122. Reference numeral 124 denotes a viewfinder for observing an object image, which includes a liquid crystal display panel or the like.

Using the optical system according to each example in the image pickup apparatus in this way can provide an image pickup apparatus that can capture an image at a wide angle of view while increasing an imaging magnification of the object in a central area of the angle of view.

Figure 15:
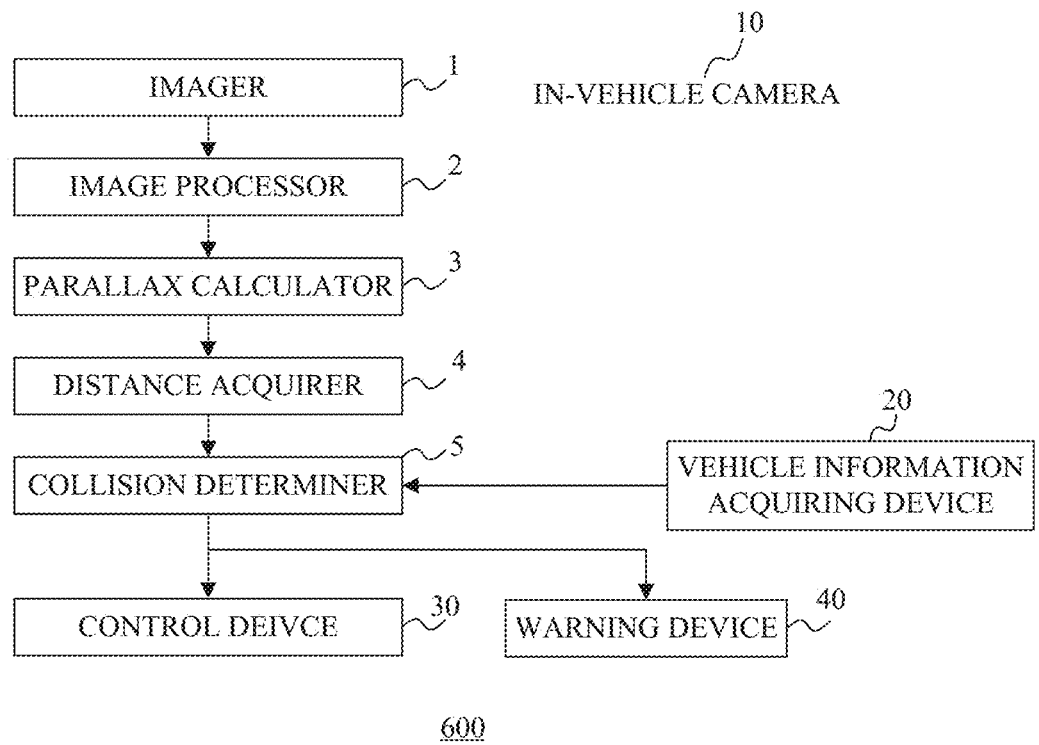
FIG. 15 is a block diagram showing a configuration of an in-vehicle system using the optical system according to each example.
Figure 16:
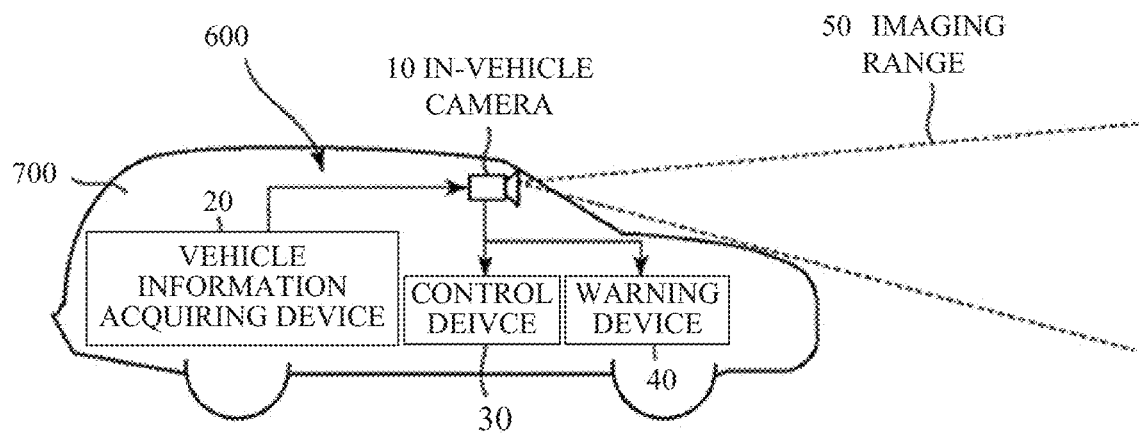
FIG. 16 is a schematic view of a vehicle including the in-vehicle system.

FIG. 15 shows a configuration of an in-vehicle camera 10 using the optical system according to each example and an in-vehicle system (driving support apparatus) 600 including the in-vehicle camera 10. The in-vehicle system 600 is held by a mover (mobile apparatus) that is configured to move, such as an automobile (vehicle), and supports driving (maneuvering) of the vehicle based on image information around the vehicle acquired by the in-vehicle camera 10. FIG. 16 is a schematic view of a vehicle 700 that serves as the mobile apparatus including the in-vehicle system 600. Although FIG. 16 shows an imaging range 50 of the vehicle-mounted camera 10 set in front of the vehicle 700, the imaging range 50 may be set to the back or side of the vehicle 700.

As illustrated in FIG. 15, the in-vehicle system 600 includes the in-vehicle camera 10, the vehicle information acquiring device 20, a control device (controller ECU: electronic control unit) 30, and a warning device (warning unit) 40. The in-vehicle camera 10 includes an imager 1, an image processor 2, a parallax calculator 3, a distance acquirer 4, and a collision determiner 5. A processor includes an image processor 2, a parallax calculator 3, a distance acquirer 4, and a collision determiner 5. The imager 1 has the optical system according to any one of Examples 1 to 6 and an image sensor.

Figure 17:
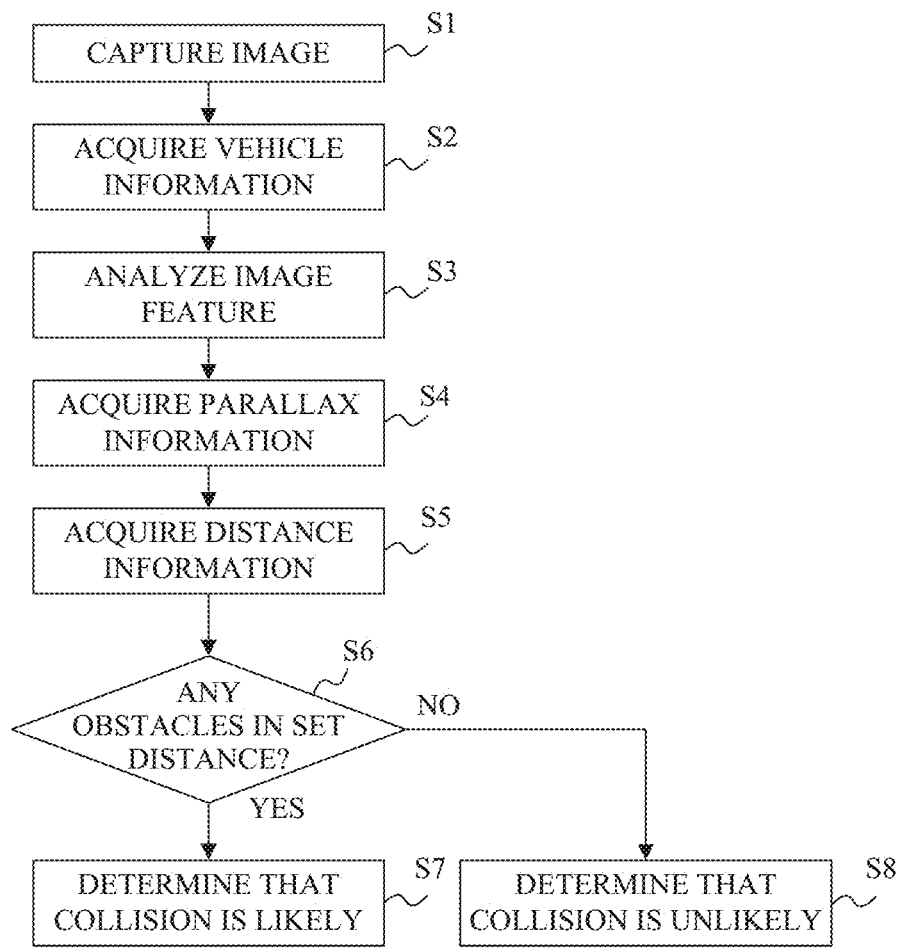
FIG. 17 is a flowchart showing an operation of the in-vehicle system.

FIG. 17 is a flowchart showing the operation of the in-vehicle system 600. First, in the step S1, the in-vehicle system 600 uses the imager 1 to image a target (object) such as an obstacle or a pedestrian around the vehicle, and acquires a plurality of image data (parallax image data). Next, in the step S2, the in-vehicle system 600 acquires vehicle information by the vehicle information acquiring device 20. The vehicle information is information including a speed, a yaw rate, a steering angle, and the like of the vehicle.

Next, in the step S3, the in-vehicle system 600 performs image processing for the plurality of image data acquired by the imager 1 by the image processor 2. More specifically, an image feature analysis is performed to analyze feature amounts such as an edge amount and direction, and a density value in the image data. Here, the image feature analysis may be performed for each of a plurality of image data, or may be performed on only part of the image data among the plurality of image data.

Next, in the step S4, the in-vehicle system 600 calculates the parallax (image shift) information between the plurality of image data acquired by the imager 1 by the parallax calculator 3. As a method for calculating the parallax information, a known method such as the SSDA method or the area correlation method can be used. The steps S2, S3, and S4 may be performed in the above order or in parallel.

Next, in the step S5, the in-vehicle system 600 acquires (calculates) distance information from the object imaged by the imager 1 by the distance acquirer 4. The distance information can be calculated based on the parallax information calculated by the parallax calculator 3 and the internal and external parameters of the imager 1. The distance information here is information on a relative position with the object such as a distance from the object, a defocus amount, and an image shift amount, and may directly represent a distance value from the object in the image or indirectly represent information corresponding to the distance value.

Next, in the step S6, the in-vehicle system 600 uses the vehicle information acquired by the vehicle information acquiring device 20 and the distance information calculated by the distance acquirer 4, and determines whether or not the distance to the object is included in a preset distance range through the collision determiner 5. Thereby, it is possible to determine whether or not the object exists within the set distance range around the vehicle, and to determine a likelihood of a collision between the vehicle and the object. The collision determiner 5 determines that the collision is likely when the object exists within the set distance range (step S7), and determines that the collision is unlikely when the object does not exist within the set distance range (step S8).

When the collision determiner 5 determines that the collision is likely, the collision determiner 5 informs (transmits) the determination result to the control device 30 and the warning device 40. At this time, the control device 30 controls the vehicle based on the determination result of the collision determiner 5 (step S6), and the warning device 40 warns the vehicle user (driver, passenger) based on the determination result of the collision determiner 5 (step S7). The determination result may be notified to at least one of the control device 30 and the warning device 40.

The control device 30 can control a movement of the vehicle by outputting a control signal to a driving unit (engine, motor, etc.) of the vehicle. For example, the vehicle can provide a control such as applying a brake, releasing an accelerator, turning a steering wheel, generating a control signal for generating a braking force on each wheel to suppress the output of an engine or a motor. In addition, the warning device 40 gives a warning to the user, for example, issuing a warning sound (alert), displaying warning information on a screen of a car navigation system, or vibrating a seat belt or steering wheel.

The in-vehicle system 600 can effectively detect the object and avoid the collision between the vehicle and the object. In particular, using the optical system according to each example for the in-vehicle system 600 can detect the object and determine the collision over a wide angle of view while reducing the size of the entire in-vehicle camera 10 and increasing the degree of freedom of the arrangement.

There are various methods for acquiring the distance information. For example, a pupil division type image sensor including a plurality of pixels regularly arranged in a two-dimensional array may be used for the image sensor included in the imager 1. In the pupil division type image sensor, one pixel includes a microlens and a plurality of photoelectric converters, receives a pair of light fluxes passing through different areas in the pupil of the optical system, and acquire a pair of image data from the photoelectric converters. The image shift amount of each area is calculated by the correlation calculation between the pair of image data, and image shift map data representing a distribution of the image shift amount is calculated by the distance acquirer 4. The distance acquirer 4 may convert the image shift amount into a defocus amount to generate defocus map data representing a distribution of the defocus amounts (distribution on the two-dimensional plane of the captured images). Further, the distance acquirer 4 may acquire the distance map data of the distance to the object converted from the defocus amount.

The in-vehicle system 600 and the mobile device 700 may include an informing device (informer) that informs a manufacturer of the in-vehicle system, a seller (dealer) of the mobile device, etc. that the vehicle 700 collides with any obstacles. For example, the informing device may be a device that transmits information (collision information) on a collision between the mobile device 700 and the obstacle to a preset external addressee (destination) by e-mail or the like.

In this way, the automatic informing configuration of the collision information through the informing device can promptly take measures such as an inspection and a repair after the collision occurs. The addressee of the collision information may be an insurance company, a medical institution, the police, or any user set destination. The informing device may send not only the collision information but also failure information of each part and the consumption information of consumables to the addressee. The presence or absence of the collision may be detected by using the distance information acquired based on the output from a light receiver, or by another detector (sensor).

This embodiment applies the in-vehicle system 600 to the driving support (collision damage mitigation), but the present invention is not limited to this embodiment, and the in-vehicle system 600 is applicable to the cruise control (including all vehicle speed tracking function), automatic driving, and the like. The in-vehicle system 600 is applicable not only to a vehicle such as an automobile but also to a moving body such as a ship, an aircraft, or an industrial robot. It is applicable not only to the moving body but also to various devices that utilize object recognition such as an intelligent transportation system (ITS).

Each example can provide an optical system, an image pickup apparatus, an in-vehicle system, and a moving apparatus, each of which has a large imaging magnification in the central area and a wide angle of view.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-054087, filed on Mar. 25, 2020, which is hereby incorporated by reference herein in its entirety.

What is claimed is:

1. An optical system comprising a front lens unit having a positive or negative refractive power, a diaphragm, and a rear lens unit having a positive refractive power, which are arranged in this order from an object side to an image side,
    wherein the front lens unit includes an aspherical lens that has a positive refractive power on an optical axis, and is disposed closest to an object,
    wherein the aspherical lens has an aspherical surface on the object side in which an off-axis radius of curvature is larger than an on-axis radius of curvature, and
    wherein the following conditional expressions are satisfied:

$$0.45 \leq D1s/L \leq 0.65$$

$$2.6 \leq Dr8/Dr4 \leq 30.0$$

where D1s is a distance on the optical axis from the aspherical surface to the diaphragm, L is an overall optical length of the optical system, and Dr4 and Dr8 are sag amounts from a reference spherical surface at positions of 40% and 80% of an effective diameter of the aspherical surface, respectively, the reference spherical surface being a spherical surface passing through a point of the aspherical surface on the optical axis and a point of the aspherical surface at a position of the effective diameter.

2. The optical system according to claim 1, wherein the reference spherical surface of the aspherical surface is a spherical surface that is convex toward the object side.

3. The optical system according to claim 1, wherein the following conditional expression is satisfied:

$$0.3 \leq refR1/D1s \leq 1.0$$

where refR1 is a radius of curvature of the reference spherical surface.

4. The optical system according to claim 1, wherein the following conditional expression is satisfied:

$$-2.0 \leq \Delta P08/P00 \leq -0.5$$

where P00 is a refractive power of the aspherical lens on the optical axis, and ΔP08 is a difference between the refractive power of the aspherical lens on the optical axis and a refractive power at the position of 80% of the effective diameter.

5. The optical system according to claim 1, wherein the aspherical lens has an aspherical surface on the image side, and
    wherein the following conditional expression is satisfied:

$$-0.2 \leq (refR1-refR2)/(refR1+refR2) \leq 0.2$$

refR1 and refR2 are radii of curvature of reference spherical surfaces of an object-side surface and an image-side surface of the aspherical lens, respectively.

6. The optical system according to claim 1, wherein the following conditional expression is satisfied:

$$0.38 \leq D2s/L \leq 0.60$$

where D2s is a distance on the optical axis from a surface of the aspherical lens on the image side to the diaphragm.

7. The optical system according to claim 1, wherein a paraxial refractive power of the aspherical lens is a positive refractive power.

8. The optical system according to claim 1, wherein the following conditional expression is satisfied:

$$0.03 \leq |Dr8/refR1| \leq 0.08$$

where refR1 is a radius of curvature of the reference spherical surface.

9. The optical system according to claim 1, wherein the following conditional expression is satisfied:

$$3.0 \leq L/f \leq 6.0$$

where f is a focal length of the optical system.

10. An image pickup apparatus comprising:
    an optical system comprising a front lens unit having a positive or negative refractive power, a diaphragm, and a rear lens unit having a positive refractive power, which are arranged in this order from an object side to an image side;
    an image sensor configured to image an object via the optical system,
    wherein the front lens unit includes an aspherical lens that has a positive refractive power on an optical axis, and is disposed closest to the object,
    wherein the aspherical lens has an aspherical surface on the object side in which an off-axis radius of curvature is larger than an on-axis radius of curvature, and
    wherein the following conditional expressions are satisfied:

$$0.45 \leq D1s/L \leq 0.65$$

$$2.6 \leq Dr8/Dr4 \leq 30.0$$

where D1s is a distance on the optical axis from the aspherical surface to the diaphragm, L is an overall optical length of the optical system, and Dr4 and Dr8 are sag amounts from a reference spherical surface at positions of 40% and 80% of an effective diameter of the aspherical surface, respectively, the reference spherical surface being a spherical surface passing through a point of the aspherical surface on the optical axis and a point of the aspherical surface at a position of the effective diameter.

11. The image pickup apparatus according to claim 10, wherein the following conditional expression is satisfied:

$$0.7 \leq |Y/f \tan \omega - 1| < 1.0$$

where Y is a maximum image height, f is a focal length of the optical system, and ω is a maximum angle of view.

12. An in-vehicle system comprising:
an image pickup apparatus; and
a determiner configured to determine whether or not an object exists in a present distance range,
wherein the image pickup apparatus includes:
an optical system consisting of a front lens unit having a positive or negative refractive power, a diaphragm, and a rear lens unit having a positive refractive power, which are arranged in this order from an object side to an image side;
an image sensor configured to image an object via the optical system,
wherein the front lens unit includes an aspherical lens that has a positive refractive power on an optical axis, and is disposed closest to the object,
wherein the aspherical lens has an aspherical surface on the object side in which an off-axis radius of curvature is larger than an on-axis radius of curvature, and
wherein the following conditional expressions are satisfied:

$$0.45 \leq D1s/L \leq 0.65$$

$$2.6 \leq Dr8/Dr4 \leq 30.0$$

where D1s is a distance on the optical axis from the aspherical surface to the diaphragm, L is an overall optical length of the optical system, and Dr4 and Dr8 are sag amounts from a reference spherical surface at positions of 40% and 80% of an effective diameter of the aspherical surface, respectively, the reference spherical surface being a spherical surface passing through a point of the aspherical surface on the optical axis and a point of the aspherical surface at a position of the effective diameter.

13. The in-vehicle system according to claim 12, further comprising a control device configured to output a control signal for generating a braking force in a driving unit of the vehicle when the object is determined to exist in the present distance range.

14. The in-vehicle system according to claim 12, further comprising a warning device configured to warn a user of the vehicle when the object is determined to exist in the present distance range.

15. The in-vehicle system according to claim 12, further comprising an informing device configured to inform information on a collision between the vehicle and the object.

16. A moving apparatus comprising the image pickup apparatus according to claim 10, and a driving unit,
wherein the moving apparatus is moved by the driving unit.

17. The moving apparatus according to claim 16, further comprising a determiner configured to determine whether or not an object exists in a present distance range.

18. The moving apparatus according to claim 17, further comprising a control device configured to output a control signal for generating a braking force in a driving unit of the moving apparatus when the object is determined to exist in the present distance range.

19. The moving apparatus according to claim 17, further comprising a warning device configured to warn a user of the moving apparatus when the object is determined to exist in the present distance range.

20. The moving apparatus according to claim 16, further comprising an informing device configured to inform information on the collision between the moving apparatus and the object.

* * * * *